US007079599B2

(12) United States Patent
Karaoguz

(10) Patent No.: US 7,079,599 B2
(45) Date of Patent: Jul. 18, 2006

(54) MULTI-MODE QUADRATURE AMPLITUDE MODULATION RECEIVER FOR HIGH RATE WIRELESS PERSONAL AREA NETWORKS

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 842 days.

(21) Appl. No.: 09/949,989

(22) Filed: Sep. 10, 2001

(65) Prior Publication Data

US 2002/0159544 A1 Oct. 31, 2002

Related U.S. Application Data

(63) Continuation-in-part of application No. 09/872,645, filed on Jun. 1, 2001.

(60) Provisional application No. 60/272,182, filed on Feb. 28, 2001.

(51) Int. Cl.
*H04L 27/22* (2006.01)
(52) U.S. Cl. .................................... 375/329
(58) Field of Classification Search ................ 375/329, 375/316, 322, 377, 229, 232, 233, 379, 326
See application file for complete search history.

(56) References Cited

U.S. PATENT DOCUMENTS

| | | | | |
|---|---|---|---|---|
| 5,970,397 A | * | 10/1999 | Klank et al. | 455/139 |
| 5,995,572 A | * | 11/1999 | Dettmar | 375/368 |
| 6,130,922 A | * | 10/2000 | Stott et al. | 375/344 |
| 6,456,649 B1 | * | 9/2002 | Isaksson et al. | 375/222 |
| 6,618,352 B1 | * | 9/2003 | Shirakata et al. | 370/203 |

OTHER PUBLICATIONS

Lars Erup, Flod M. Gardner, and Robert A. Harris, Interpolation in Digital Modems-Part II: Implementation and Performance, IEEE Transcations on Communications, vol. 41, No. 6, Jun. 1993.
Pierre R. Chevillat, Dietrich Maiwald, and Gottfried Ungerboeck, Rapid Training of a Voiceband Data-Modem Receiver Employing an Equalizer with Fractional-T Spaced Coefficients, IEEE Transactions on Communications, vol. COM-35, No. 9, Sep. 1987.

* cited by examiner

*Primary Examiner*—Kevin Burd
(74) *Attorney, Agent, or Firm*—Garlick Harrison & Markison LLP

(57) ABSTRACT

A wireless transceiver includes a Radio Frequency (RF) transceiver, a baseband transmitter section, and a baseband receiver section. The baseband receiver section receives a baseband signal from the RF transceiver, extracts data therefrom, and provides the data to a host system. The baseband receiver section includes a programmable gain amplifier, an Analog-to-Digital Converter (ADC), a symbol timing compensation section, an RF carrier compensation section, a decision feedback equalizer section, and a preamble processor. The symbol timing compensation section modifies the samples of the baseband signal to compensate for symbol timing variations between a symbol clock of the wireless device and a symbol clock of a transmitting wireless device. The RF carrier compensation section modifies the samples of the baseband signal to compensate for RF carrier variations between an RF carrier of the wireless device and an RF carrier of the transmitting wireless device. The preamble processor determines a PGA gain factor, initial settings for the RF carrier compensation section, and equalizer coefficients.

20 Claims, 11 Drawing Sheets

MULTI-MODE QUADRATURE AMPLITUDE MODULATION RECEIVER FOR HIGH RATE WIRELESS PERSONAL AREA NETWORKS

CROSS REFERENCES TO RELATED APPLICATIONS

This application claims priority to U.S. Provisional Application Ser. No. 60/272,182, filed Feb. 28, 2001 and this application is a continuation-in-part of U.S. regular application Ser. No. 09/872,645 filed Jun. 1, 2001 and entitled "Trellis Code Modulation Tails", both of which are incorporated herein by reference in their entirety.

FIELD OF THE INVENTION

This invention relates generally to wireless communications; and more particularly to low power high data rate multimedia wireless communications.

BACKGROUND OF THE INVENTION

Communication technologies that link electronic devices are well known in the art. Some communication technologies link electronic devices via networks. Examples of such networks include wired computer networks, wireless computer networks, wired telephone networks, wireless telephone networks, and satellite communication networks, among other networks. Within such communication networks, a network infrastructure couples electronic devices to one another.

The need for wireless networking has been addressed by various standards bodies that promulgate interworking standards. One such standards body promulgated the IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data. However, IEEE 802.11 networks lack high data rate and Quality of Service (QOS) features to support multimedia communications.

Wireless personal area networks "WPAN" enable short-range "ad-hoc" connectivity among portable consumer electronics and communications devices but do not require the infrastructure needed for an 802.11 network. The coverage area for a WPAN is generally within a 10-meter radius. The term "ad-hoc" connectivity refers to both the ability for a device to assume either master or slave functionality and the ease in which devices may join or leave an existing network.

The Bluetooth radio system has emerged as the first technology addressing WPAN applications with its salient features of low power consumption, small package size, and low cost. Raw data rates for Bluetooth devices are limited to 1 Mbps, although the actual throughput is about half of the raw data rate. A Bluetooth communication link supports up to three voice channels with very limited additional bandwidth for bursty data traffic. However, Bluetooth communication links cannot support the data transfer requirements of portable consumer electronics devices that transmit and receive multimedia data, e.g., high quality video applications, audio applications, and multi-megabyte file transfers for music and image files.

Additional limitations placed upon such devices relates to their cost and power consumption. Many devices operating in an ad-hoc network are battery powered. Thus, the power consumption requirements placed on the device by the integrated circuitry servicing its communications should be minimal. Further, because these electronic devices are typically low in cost, the communication circuitry contained therein must be high in performance but low in cost. Operationally stable, high data rate communication circuitry, e.g., RF front end circuitry, frequency/phase reference circuitry, etc., is high in cost. In lower cost applications, components that are highly stable cannot be employed. Thus, these lower cost components suffer from RF carrier frequency drift, symbol clock frequency drift, and other synchronization related problems. In order to support high data rate communications, these operational problems must be overcome.

Thus, there is a need in the art for wireless communication circuit components that support high data rate communications, that consume little power, and that are relatively inexpensive to produce and operate.

SUMMARY OF THE INVENTION

In order to overcome the above-cited shortcomings of the prior devices, systems, and operations, among other shortcomings, a wireless device constructed according to the present invention includes a wireless transceiver that compensates for the operational shortcomings of both itself and for those of a wireless device with which it communicates. The wireless transceiver includes a Radio Frequency (RF) transceiver, a baseband transmitter section, and a baseband receiver section. The baseband transmitter section receives data from a host system of the wireless device, codes the data into a baseband signal, and couples the baseband signal to the RF transceiver. The RF transceiver couples the baseband signal to an RF carrier and wirelessly transmits this RF signal to the wireless device with a communicating wireless device.

The baseband receiver section receives a baseband signal from the RF transceiver, extracts data therefrom, and provides the data to a host system. The baseband receiver section includes a programmable gain amplifier (PGA), an Analog-to-Digital Converter (ADC), a symbol timing compensation section, an RF carrier compensation section, a decision feedback equalizer section, and a preamble processor.

The PGA receives the baseband signal from the RF transceiver and adjusts the gain of the baseband signal by a gain factor. The ADC receives the baseband signal from the programmable gain amplifier and samples the baseband signal at a symbol clock frequency to produce samples of the baseband signal. However, in another embodiment, a PGA resides instead within the RF transceiver to adjust the gain of the baseband signal prior to providing the signal to the baseband receiver section. Further, in still another embodiment, a first PGA resides with the RF transceiver and a second PGA resides within the baseband receiver section, both of which adjust the amplitude of the received signal.

The symbol timing compensation section modifies the samples of the baseband signal to compensate for symbol clock variations between the symbol clock of the wireless device and the symbol clock of a transmitting wireless device. Further, the RF carrier compensation section modifies the samples of the baseband signal to compensate for carrier variations between the RF carrier of the wireless device and the RF carrier of the transmitting wireless device.

Finally, the decision feedback equalizer section filters the modified samples of the baseband signal based upon equalizer coefficients and extracts the data from the modified samples of the baseband signal.

The preamble processor receives a preamble of a frame that carries the data and, based upon the preamble: (1) estimates the gain factor to be applied by the programmable gain amplifier; (2) estimates initial settings for the RF carrier compensation section; and (3) estimates equalizer coefficients for the decision feedback equalizer.

In combination, these components of the baseband receiver section compensate for variations in the symbol clocks and the RF carriers of the transmitting and receiving devices. With this compensation performed, higher order modulation schemes, e.g., 64 QAM, may be employed using low power consumption, low cost components. Resultantly, a wireless device in which the present invention is deployed services high data rate wireless transmissions at a low cost and that supports long battery life.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
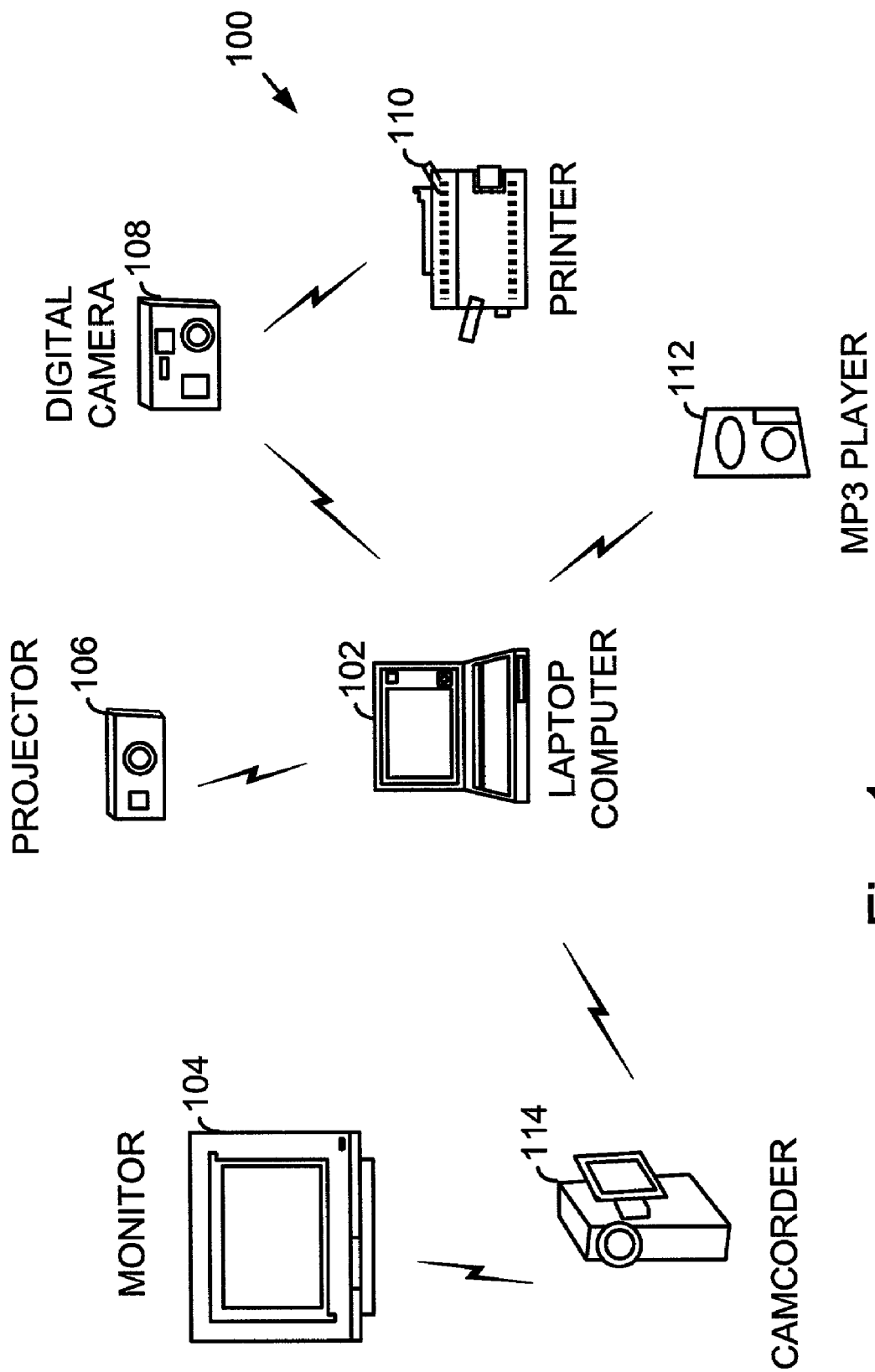
FIG. 1 is a system diagram illustrating a number of Wireless Personal Area Network (WPAN) electronic devices that wirelessly communicate according to the present invention.

FIG. 1 is a system diagram illustrating a number of Wireless Personal Area Network (WPAN) electronic devices that wirelessly communicate according to the present invention. These devices include a laptop computer 102, a monitor 104, a projector 106, a digital camera 108, a printer 110, an MP3 player 112, and a camcorder 114 (among other devices that may wirelessly communicate according to the present invention). These devices wireless intercouple by establishing and breaking down WPANs. Each of these devices includes a wireless interface constructed according to the present invention that includes a transmit path and a receive path. The description of the present invention focuses on the receive path, i.e. a receiver constructed according to the present invention. The communication requirements serviced according to the present invention may be grouped into two general categories. The first category involves bulky (multi-mega-byte), data file transfers. The second category involves the transfer of streaming data, e.g., video and audio data, and the transfer of other data in a near real-time application.

In an example of a communication of the first category, the digital camera 108 and the camcorder 114 store multi-mega-byte image files and video streams in digital format. These files must be transferred from the devices to a central repository such as the laptop computer 102. Thus, according to the present invention, during one operation, the digital camera 108 and the laptop computer 102 establish a WPAN link and the digital camera 108 downloads one or more image files to the laptop computer 102. The size of such an image file may be 3 Mbyte or greater. According to the present invention, this 3 Mbyte file may be downloaded in a matter of a few seconds, as compared to minutes that would be required using prior wireless technologies.

Another related application of the first category is in the digital distribution of music where music files in MP3 or CD format can be transferred between a computer, e.g., laptop computer 102 and an MP3 or CD player, e.g., MP3 Player 112. In particular, an MP3 file containing a single song can be much larger than 3 Mbytes, which necessitates physical layer data rates much higher than 1 Mega bits per second (Mbps) if the transfer is to be completed within a 7 to 15 second time frame. According to the present invention, at data rates of 22 Mbps to 55 Mbps, the 3 Mbyte file is downloaded in a matter of seconds.

In an example of a communication of the second category, the high rate WPAN of the present invention is used as a cable replacement technology for computer systems, home entertainment systems, gaming systems, and other systems requiring streaming (or near streaming) communication operations. For example, the WPAN of the present invention may be used to transfer data from the laptop computer 102 to the projector 106 or to the printer 110. Further, the WPAN of the present invention may be employed by the camcorder 114 to stream digital video data to the monitor 104. According to the present invention, data streams of up to 55 Mbps are supported at a distance of up to approximately 10 Meters.

The high rate WPAN of the present invention may be employed for interactive games, which are built around 3-D graphics and high quality audio. In such case, a high rate WPAN is established to wirelessly connect multi-player game consoles and high definition displays or virtual-reality goggles. With the high data rate WPAN of the present invention, the high-quality-graphics-based interactive games having multiple consoles and virtual-reality-goggles are easily serviced at required levels.

The high rate WPAN of the present invention may find compelling applications as a cable replacement technology for home entertainment systems capable of high definition video and high fidelity sound. The distribution of CD audio quality sound requires 1.5 Mbps data rate, while AC3 Dolby and MP3 audio streams require 384 Kbps and 128 Kbps, respectively. Consequently, with the WPAN of the present invention, a high rate WPAN can be established between a CD or MP3 player 112 and wireless headsets or speakers and employed to service all communications there between. Further, the WPAN of the present invention may be employed to wirelessly direct high quality audio from a source to surround sound speakers.

The WPAN of the present invention supports "ad-hoc" networking, multi-media QoS provisions, and power management. In an "ad-hoc" network, devices can assume either master or slave functionality based on existing network conditions. Devices in an ad-hoc network need not be assigned any Ethernet or IP addresses, and can subsequently join or leave an existing network without elaborate set-up procedures that are otherwise carried out by a system administrator. These operations, as well as others, are set forth in the IEEE 802.15.3 working group specifications. The teachings described herein relate to a receiver that operates to support the IEEE 802.15.3 specification. Table 1 describes generally the operations of a WPAN operating according to the present invention. Several of the characteristics of Table 1 are described further with reference to FIGS. 4A (channel spectrum), 4B (physical layer frame structure), 4C (physical layer/medium access control superframe structure), and 6 (modulation constellations).

TABLE 1

High Rate WPAN Operating Specifications

| | |
|---|---|
| Frequency Range | 2.4–2.4835 GHz |
| Symbol Rate | 11 Msymbols/s |
| Modulation Formats | BPSK, QPSK, 16, 32, 64-QAM/TCM |
| Coding | BPSK, QPSK: no coding |
| | 16, 32, 64-QAM: 8-State Trellis Code Modulated (TCM) |
| Data Rates | 11 Mbps (BPSK) |
| | 22 Mbps (QPSK) |
| | 33 Mbps (16-QAM/TCM) |
| | 44 Mbps (32-QAM/TCM) |
| | 55 Mbps (64-QAM/TCM) |
| Base Modulation | QPSK |
| RF Bandwidth | 15 MHz |
| Number of Channels | 4 |
| Transmit Power | 0 to 8 dBm |
| Range | 10 m |

In order to support high data rates, the WPAN devices of the present invention communicate at high symbol rates using high order modulation schemes. However, these devices are also low in cost and include many low costs components. Some cost savings result in using devices that have relatively high drift in reference clocks, clocks that establish symbol timing and RF carrier frequency. Thus, any two devices in communication may have poor carrier frequency and symbol synchronization. In prior systems, such poor synchronization placed severe limitations on achievable data rates because lower symbol rates and lower modulation schemes were required. However, according to the present invention, the receiver of each WPAN device includes significant improvements to overcome mismatches caused by both RF carriers and symbol clock frequencies. Such improvements are described in detail with reference to FIGS. 2A through 9.

Figure 2A:
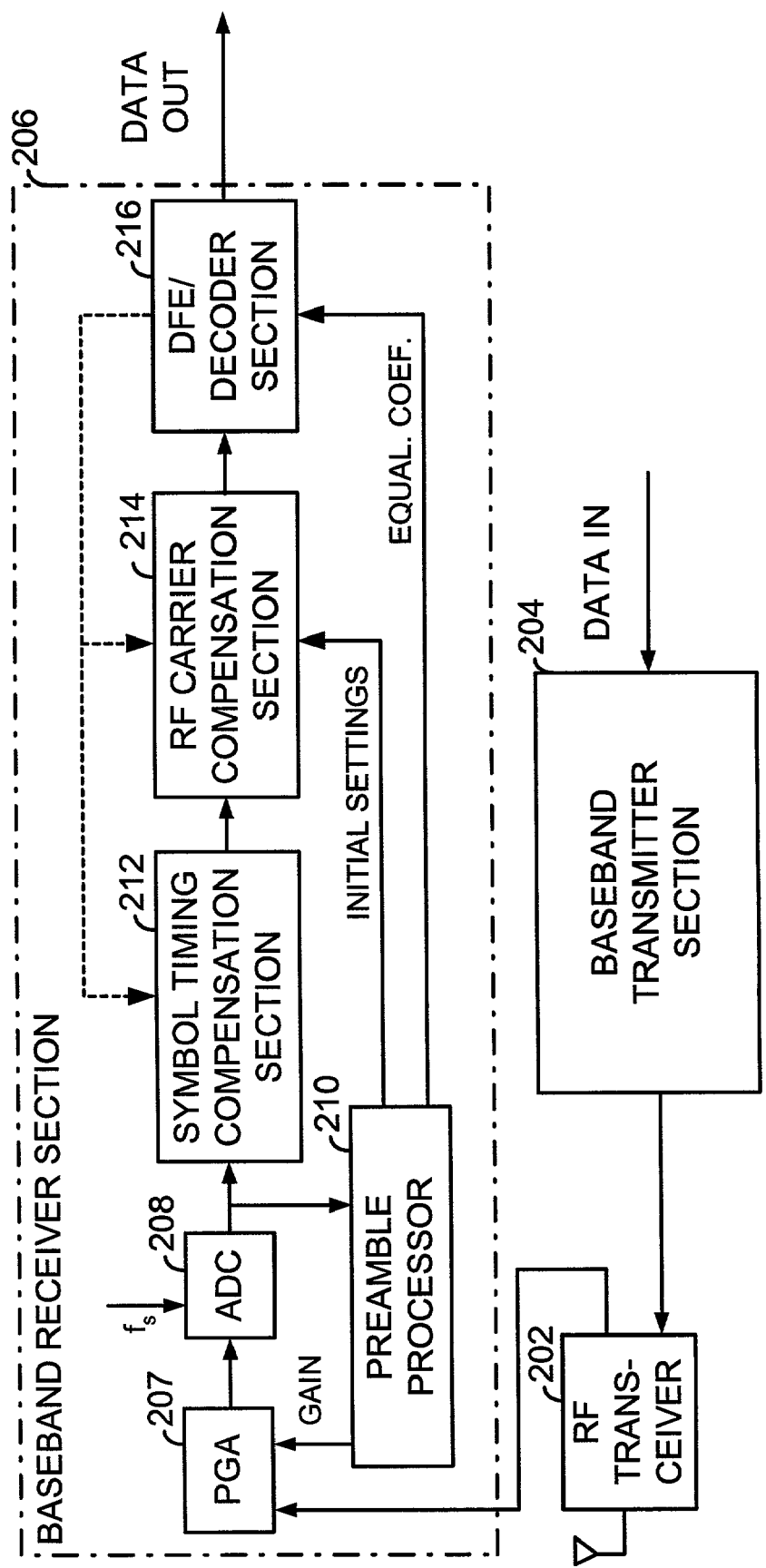
FIG. 2A is a block diagram illustrating a wireless transceiver constructed according to the present invention that supports high data rate communications.

FIG. 2A is a block diagram illustrating a wireless transceiver constructed according to the present invention that supports high data rate communications. The components of the wireless transceiver are resident in a wireless device, e.g., one of the devices shown in FIG. 1, are illustrated only generally, and will be described in more detail with reference to FIGS. 2B through 9. A Radio Frequency (RF) transceiver 202 couples to both a baseband transmitter section 204 and to a baseband receiver section 206. In combination, the baseband transmitter section 204 and the baseband receiver section 206 may be referred to as a baseband transceiver. The baseband transmitter section 204 receives digital data to be transmitted from a host, codes the digital data into a baseband signal, and passes the baseband signal to the RF transceiver 202. The RF transceiver 202 couples the baseband signal to an RF carrier to create an RF signal and transmits the RF signal to a receiving WPAN device across a wireless link. Such coding, modulation, and transmission are performed consistent with the parameters of TABLE 1 above.

The baseband receiver section 206 receives a baseband signal that carries coded data from the RF transceiver 202. A Programmable Gain Amplifier (PGA) 207 adjusts the gain of the baseband signal and then provides the gain-adjusted baseband signal to an Analog-to-Digital Converter (ADC) 208 for sampling. The ADC 208 samples the gain adjusted baseband signal at a particular sampling frequency, $f_s$ (that is the symbol clock frequency of the baseband transceiver), to produce samples thereof. This sampling frequency, $f_s$, drifts with respect to a symbol clock frequency of the corresponding transmitting device.

A preamble processor 210 couples to the output of the ADC 208 and analyzes a preamble sequence contained in each received physical layer frame. Based upon the preamble sequence, the preamble processor 210 determines a gain to be applied to portions of the baseband signal corresponding to the data carrying portions of the frame and provides this gain to the PGA 207. In the described embodiment, the RF transceiver 202 also includes a PGA that adjusts the gain of the received signal prior to providing the received signal to the baseband receiver section 206. The PGA located in the RF transceiver 202 adjusts the gain of the received signal based upon a Received Signal Strength Indication (RSSI) of the received signal. In such case, the PGA of the RF transceiver 202 performs relatively coarse gain adjustments to the received signal while the PGA 207 of the baseband receiver section 206 performs relatively fine gain adjustments to the baseband signal. In combination, these PGAs adjust the received signal so that its dynamic range corresponds to the dynamic range of the ADC 208.

Based upon the received preamble sequence, the preamble processor 210 also estimates initial RF carrier compensation settings for the received frame. The initial RF carrier compensation settings are based upon the difference in the RF carrier of the RF transceiver 202 and the RF carrier of a corresponding RF transceiver in the transmitting device, as detected in the preamble sequence. These initial RF carrier compensation settings are provided to the RF carrier compensation section 214 for its subsequent use with the remaining portions of the data frame. While the initial RF carrier compensation settings do not fully compensate for the RF carrier offset between the transmitting and receiving devices across the data frame, they provide a sound starting point. In a typical implementation, an uncompensated RF carrier offset is in the range of 300 kHz. After compensation according to the initial RF carrier compensation settings, the RF carrier offset may be reduced so that it is in the range of 200 Hz. Thus, significant benefits are derived from the preamble processing and RF carrier compensation based thereon.

The preamble processor 210, based upon the preamble sequence, also determines equalizer coefficients that are employed by a Decision Feedback Equalizer (DFE)/Decoder Section 216 that extracts data from the sampled baseband signal (as modified by the symbol timing compensation section 212 and RF carrier compensation section 214). The manner in which the preamble processor 210 characterizes a serving channel and generates equalizer coefficients based thereon is generally known in the art and will be described further herein with reference to FIG. 5.

Symbol timing compensation section 212 compensates for offsets between the symbol clock of the baseband receiver section 206 and the symbol clock of a corresponding transmitting device. The RF carrier compensation section 214 compensates for offsets between the RF carrier of the RF transceiver 202 and the RF carrier of an RF transceiver of the transmitting device. The symbol timing compensation section 212 and the RF carrier compensation section 214 both operate while data is being recovered by the baseband receiver section 206 from the data carrying portion of the frame that follows the preamble. With these elements operating in unison, a wireless device including these elements supports high data rate data communications.

Figure 2B:
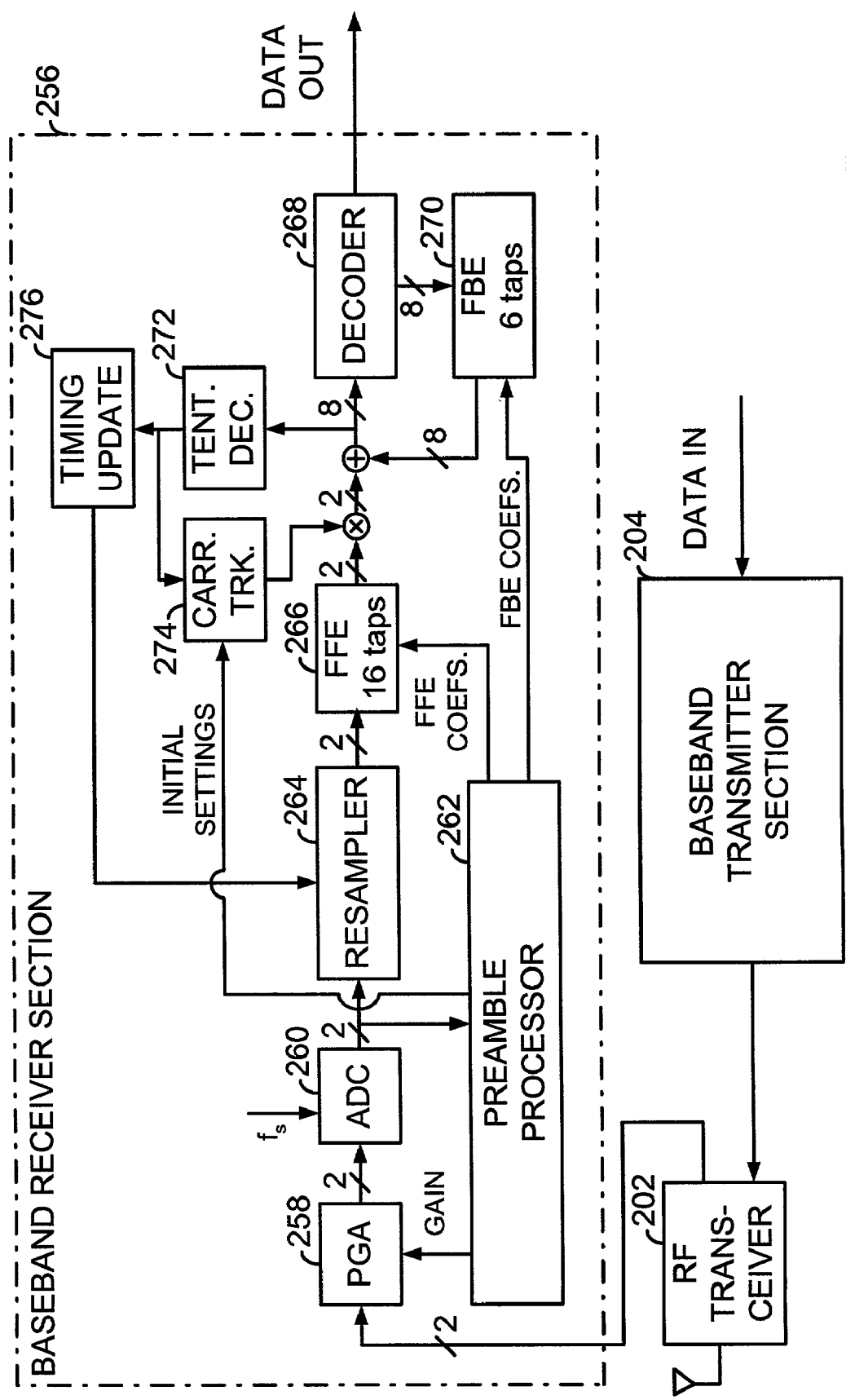
FIG. 2B is a block diagram illustrating in more detail the wireless transceiver of FIG. 2A.

FIG. 2B is a block diagram illustrating in more detail the wireless transceiver of FIG. 2A. The transceiver includes a Radio Frequency (RF) transceiver 202, a baseband transmitter section 204, and a baseband receiver section 256. The RF transceiver 202 transmits and receives data according to the channel structure described in TABLE 1 and as will be further described with reference to FIG. 4A. The baseband transmitter section 204 receives digital data in, codes the digital data into baseband signal and provides the baseband signal to the RF transceiver 202. The baseband receiver section 256 receives a baseband signal from the RF transceiver 202 and produces digital data out. The structure of the RF transceiver 202 and the baseband receiver section 204 are described only as they relate to the baseband receiver section 256. In the described embodiment, the RF transceiver 202 produces and receives both in-phase and quadrature components of the baseband signal. Thus, the signal paths and components illustrated include both in-phase and quadrature components and operate upon these components of the baseband signal (denoted as parallel paths, i.e., 2 paths). Further, the DFE/Decoder of the baseband receiver section 256 includes a decoding portion that operates upon multiple samples. Thus, these portions of the data path include 8 data components.

The baseband receiver section 256 includes a PGA 258 that receives the baseband signal from the RF transceiver 202 and, based upon a gain factor provided at its input by a preamble processor 262, adjusts the magnitude of the baseband signal. As was previously described with reference to FIG. 2A, the preamble processor 262 determines the gain to be applied to the incoming symbol signal by the PGA 258 for the subsequent data carrying portions of a frame.

The output of the PGA 258 is received by an ADC 260 that samples the output of the PGA 258 at a sampling frequency, $f_s$, also referred to as the symbol clock frequency. The sampling frequency, $f_s$, of the ADC 260 corresponds substantially to the symbol rate of the baseband signal (or a multiple thereof, e.g., twice the frequency of the baseband symbols, in a fractionally spaced embodiment). Nominally, the symbol rate according to the WPAN of the present invention is 11 Mbaud. Thus, the ADC 260 samples at a frequency that is approximately 11 MHz or a multiple thereof, e.g., 22 MHz. However, as was previously described, symbol timing mismatch between the transmitting device and the receiving device will exist. This symbol timing mismatch varies over time and may be referred to as the difference between the symbol clock of the transmitting device and the symbol clock of the receiving device.

As was partially described with reference to FIG. 2A, the preamble processor 262 determines equalizer coefficients for the DFE/decoder. Referring to FIG. 2B, the preamble processor 262 first estimates the channel based upon the preamble sequence. Then, the preamble processor 262 determines Feed Forward Equalizer (FFE) 266 coefficients and Feed Back Equalizer (FBE) 270 coefficients based upon the channel estimate. These operations will be described further with reference to FIG. 5.

As was also described with reference to FIG. 2A, the preamble processor 262 estimates initial RF carrier compensation settings for the received frame. These initial RF carrier compensation settings are provided to a carrier tracking block 274 for subsequent use, in conjunction with a tentative decision block 272, to perform RF carrier compensation operations. Such compensation is performed on the samples of the baseband signal after the FFE 266 has operated upon the samples but before the FBE 270 operates upon the samples. In other non-illustrated embodiments, the carrier tracking block 274 operates upon the samples of the baseband signal before the FFE 266 or after the FBE 270 operates upon the samples. The structure and operation of the carrier tracking block 274 and its operations will be described in detail with reference to FIG. 7.

A resampler 264 receives the output of the ADC 260 and resamples the samples of the baseband signal to compensate for symbol timing drift. The output of the resampler 264 is received by FFE 266. The resampler 264 operates in conjunction with the timing update block 276 and the decision block 272 to implement the symbol timing compensation section (and its operations) that were described with reference to FIG. 2A. The operation of these components will be described further with reference to FIGS. 8 and 9.

The baseband receiver section 256 also includes a Decoder (decision block) 268 that decodes the modified samples of the baseband signal to produce digital data. The operations of the Decoder 268 are generally known and will not be described in detail herein. One constellation that may be used in accordance with the coding and decoding operations of the present invention is described with reference to FIG. 6.

The structures described in FIGS. 2A and 2B (as well as the following FIGS.) may be embodied using various types of circuits formed using various manufacturing processes. For example, in one particular embodiment, the RF transceiver 202 is embodied in a first integrated circuit that is coupled to a second integrated circuit that includes the baseband transmitter section 204 and the baseband receiver section 206 (256), among other circuits. In another embodiment, the RF transceiver 202, the baseband transmitter section 204 and the baseband receiver section 206 (256) are all formed on a single monolithic integrated circuit. These integrated circuits may be constructed in CMOS or another semiconductor technology, e.g., PMOS, NMOS, Bipolar, etc.

Further, the structures of FIGS. 2A and 2B may be constructed using various circuit elements/combinations. In one embodiment, all structures past the ADC 208 (260) in the baseband receiver section 206 (256) are embodied using a Digital Signal Processor (DSP) or similar processing device. In another embodiment, dedicated signal path circuitry embodies each of the structural components of the baseband receiver section 206 (256). While a DSP implementation would provide more flexibility, dedicated signal path circuitry would typically provide higher performance at a lower cost and with lower power consumption.

Figure 3:
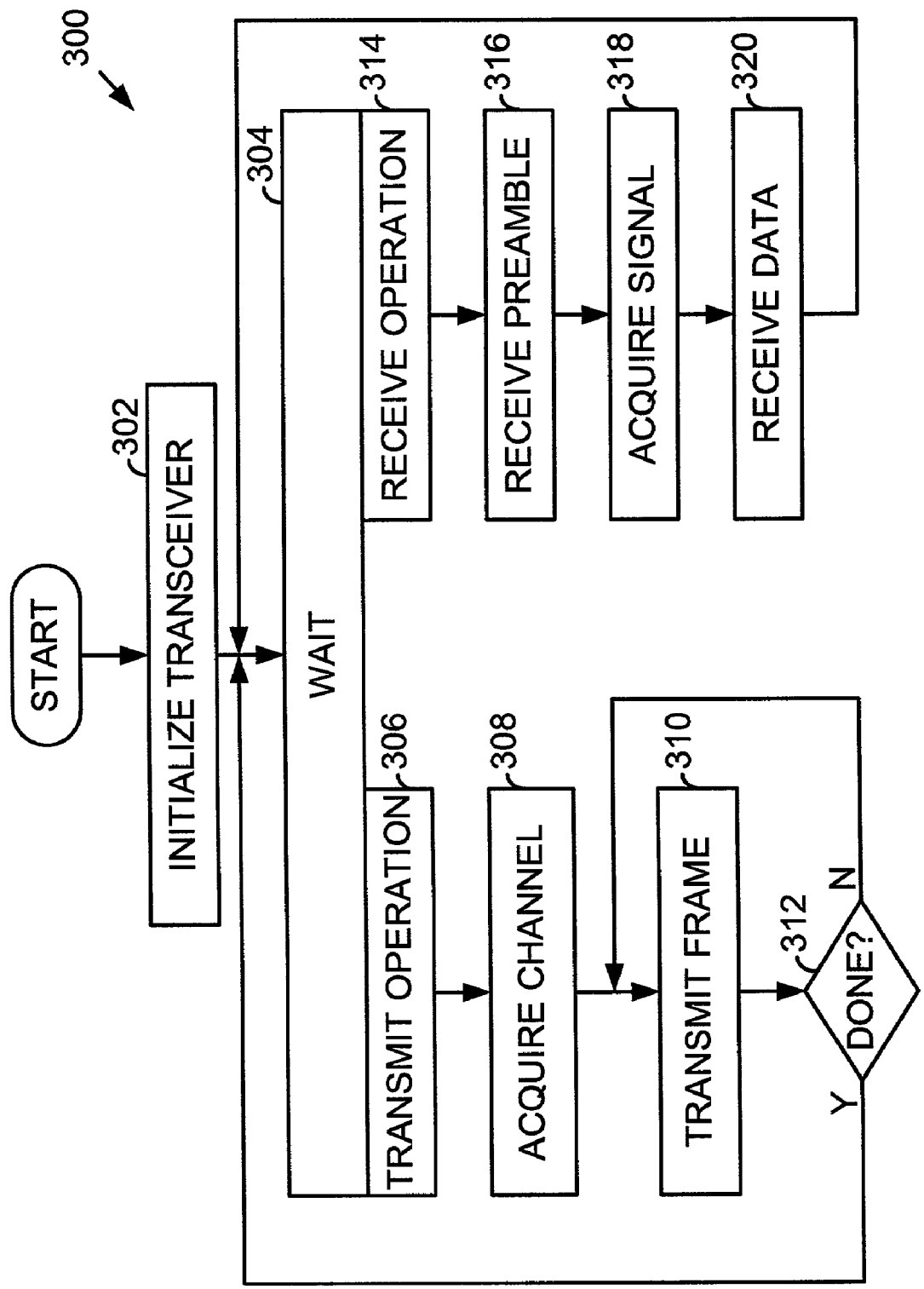
FIG. 3 is a logic diagram illustrating operation of a WPAN device according to the present invention.

FIG. 3 is a logic diagram illustrating operation of a WPAN device according to the present invention. As a first operation, the WPAN device initializes its transceiver to begin operation (step 302). The transceiver then waits until a transmit operation or a receive operation is initiated.

In a transmit operation (step 306), the transceiver first acquires a channel between itself and a receiving device (step 308). Channel acquisition operations are generally known and will not be further described herein except as they relate to the present invention. The transceiver then transmits a frame (step 310). Upon completion of the burst transmission of the frame, the WPAN device determines whether it is done transmitting (step 312).

As will be described further with reference to FIG. 4C, each superframe supported by the WPAN network includes both a contention access period and a plurality of time slots, each time slot allocated for carrying one physical frame. The WPAN device may transmit none, one, or more than one frame during each superframe. In some operations, the WPAN device is allocated adjacent frames for transmission. Thus, the WPAN device next determines if has been allocated the subsequent time slots in the super frame. If not, the WPAN returns to the wait state (step 304). If so, operation returns to step 310 where the WPAN transmits another frame to the receiving WPAN device. This frame transmission may be immediately subsequent to the prior transmission or may be later during the superframe. Alternately, if the next allocated time slot is later in the superframe, operation may return to the wait state (step 304) until the next allocated time slot is reached.

In a receive operation (step 314), the WPAN device first receives the preamble of a particular frame (step 316). Based upon the contents of the preamble of the frame, the receiving section of the WPAN device then acquires the signal (step 318). In receiving the signal, the receiving section of the WPAN device estimates the channel, determines equalizer coefficients based thereupon, determines a gain to be applied to the baseband signal during the data carrying portion of the frame, and estimates initial settings for the RF carrier compensation section. These operations were generally described with reference to FIGS. 2A and 2B and will be more fully described with reference to FIG. 5. The receiving section of the WPAN device then receives the data intended for it in the frame (step 320). From step 320, operation proceeds to step 304. From step 304, the WPAN device may be ready to receive one or more additional frames of the current superframe or of subsequent superframes. In such case, steps 314 through 320 will be repeated for each received frame.

Figure 4A:
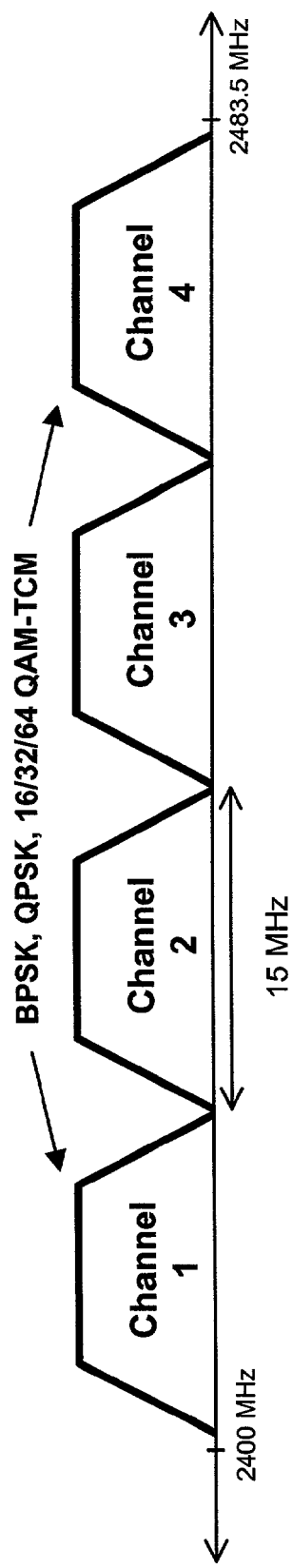
FIG. 4A is a diagram illustrating the spectrum within which the receiver of FIGS. 2A and 2B operates according to the present invention.

FIG. 4A is a diagram illustrating the spectrum within which the receiver of FIGS. 2A and 2B operates according to the present invention. Each channel of the WPAN of the present invention (generally described as an IEEE 802.15.3 system) occupies a bandwidth of 15 MHz (measured at 30 dB signal bandwidth) compared to a bandwidth of 22 MHz occupied by 802.11b channels. These bandwidths reside in a spectrum between 2400 MHz and 2483.5 MHz. As such, in comparison to 802.11b, an 802.15.3 system causes less interference to Bluetooth devices because of its smaller bandwidth occupancy. Further mitigating the coexistence problem with Bluetooth devices is the fact that 802.15.3 systems transmit at a lower power level than 802.11b systems, namely, 0 dBm vs. 20 dBm. Finally, the 15 MHz signal bandwidth used by an 802.15.3 system occupies only 20% of the Bluetooth hopping frequencies in the unlicensed 2.4 GHz band. Therefore, Bluetooth devices can operate at close to 80% throughput in the presence of an 802.15.3 system. Collaborative and non-collaborative coexistence mechanisms between 802.15.3 systems and Bluetooth systems may operate according to the present invention.

Coexistence between these systems does not imply interoperability between different systems, but ensures that the performance of one network is not adversely affected by the presence of another independent co-located network. The IEEE 802.15.3 system and 802.11b PHY layers have similar characteristics in that they both use the same symbol rate (11 Msymbols/sec) and transmit on certain fixed carrier frequencies in the 2.4 GHz band. These similarities were designed into the 802.15.3 system to facilitate coexistence with the existing 802.11b systems. However, as described herein, the 802.15.3 system uses different modulation formats and signal bandwidth compared to 802.11b systems.

Figure 4B:
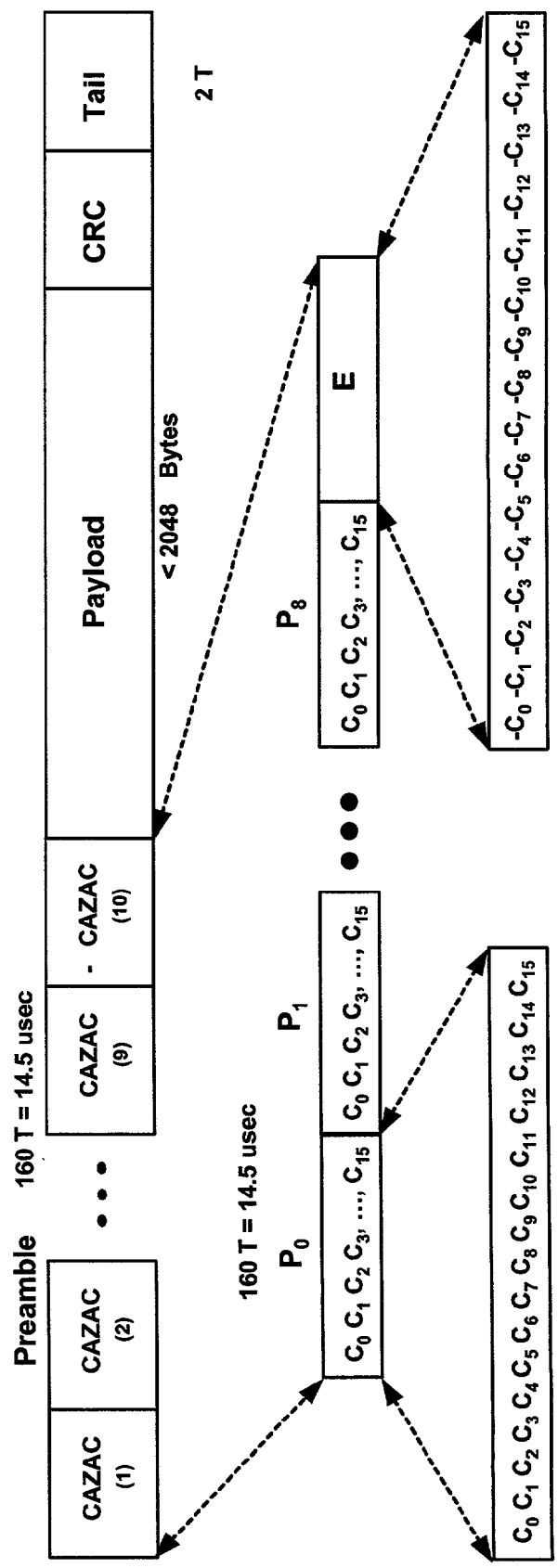
FIG. 4B is a diagram illustrating the structure of a frame operated upon by the receiver of FIGS. 2A and 2B according to the present invention.

FIG. 4B is a diagram illustrating the structure of a frame operated upon by the receiver of FIGS. 2A and 2B according to the present invention. The 802.15.3 Physical (PHY) layer frame consists of a preamble, payload, CRC, and a trellis tail as shown in FIG. 4B. The preamble contains 10 periods of a special Constant Amplitude Zero Auto-Correlation (CAZAC) sequence. CAZAC sequences have properties that are useful for rapid signal acquisition. Baseband receiver section signal acquisition algorithms for gain control, carrier-offset estimation, and channel estimation rely on the CAZAC sequence, which consists of 10 periods of 16 QPSK symbols. A 4-pbase CAZAC sequence provides good signal acquisition performance even for low SNR conditions. A 4-phase CAZAC sequence $\{c_n\}$ of length 16 symbols can be determined by:

$$c_{4 \cdot k+l} = j^{k \cdot l}, \; j=\sqrt{-1}, \; k=0,1,2,3, \; l=0,1,2,3$$

where:

$$\{c_n\}=\{1,1,1,1,j,-1,-j,1,-1,1,-1,1,-j,-1,j\}$$

By introducing a 45° phase rotation, CAZAC sequence can be transformed into a QPSK sequence:

$$\{c_n\}=\{1+j,1+j,1,+j,1+j,1+j,-1,+j,-1,-j,1-j,1+j,-1-j, \\ 1+j,-1-j,1+j,1-j,-1-j,-1+j,\}$$

Each period of the CAZAC sequence contains 16 QPSK symbols. The preamble is used for various signal acquisition functions such as gain adjustment, carrier-frequency offset compensation, symbol timing adjustment, channel estimation and calculation of equalizer coefficients.

The first nine periods of the CAZAC sequence are identical. The $10^{th}$ period of the CAZAC sequence is different from the previous nine periods in that each element of the CAZAC sequence is the 180 degrees rotated version of the original CAZAC sequence. The last period of the preamble is used to delineate between the preamble and the payload. The length of the preamble and periodicity thereof depend on the length of the overall symbol response. The 16-symbol period is sufficient to handle an overall symbol response of 1.5 microseconds, which includes the delay-spread channel. The payload contains up to 2048 bytes. It is followed by CRC bits and a trellis tail. The CRC bits are used to determine whether the payload is received with erroneous bits. A 2 symbol interval trellis tail is appended at the end of every packet to terminate the Trellis Code Modulation (TCM) code at a known state to aid in the sequence decoding process at the receiver. These operations are described in detail in co-pending application Ser. No. 09/872,645, filed Jun. 1, 2001 and entitled "Trellis Code Modulation Tails."

Figure 4C:
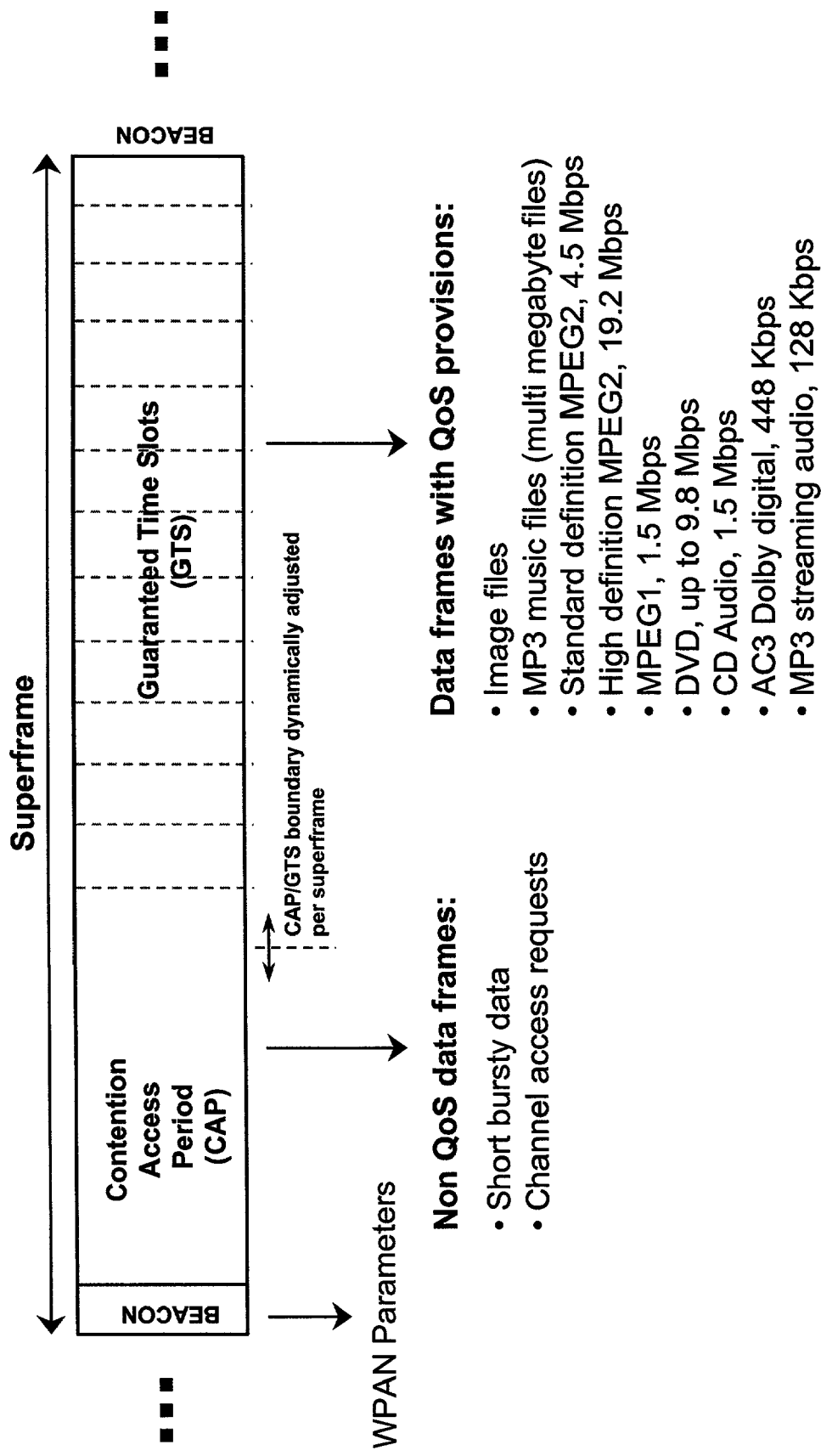
FIG. 4C is a diagram illustrating the structure of a superframe operated upon by the receiver of FIGS. 2A and 2B according to the present invention.

FIG. 4C is a diagram illustrating the structure of a superframe operated upon by the receiver of FIGS. 2A and 2B according to the present invention. The superframe structure of FIG. 4C is a MAC layer structure that includes a Beacon, a Contention Access Period (CAP) during which WPAN devices contend for available data frames, and a guaranteed time slot (GTS) period in which communicating devices are allocated dedicated time slots for transmitting data frames. In this manner, those applications having particular Quality of Service (QoS) requirements are provided with sufficient time slots for the servicing of ongoing data communications.

The network beacon is transmitted at the beginning of each superframe carrying WPAN specific parameters and information for new devices to join the ad-hoc network. The CAP period is reserved for transmitting non-QoS data frames such as short bursty data or channel access requests made by the devices in the network. The medium access mechanism during the CAP period is Collision Sense Multiple Access/Collision Avoidance (CSMA/CA). The remaining duration in the superframe is reserved for GTS to carry data frames with specific QoS provisions. The type of data transmitted within GTS can range from bulky image or music files to high quality audio, or high definition video streams. The 802.15.3 system protocol also allows for the dynamic adjustment of guaranteed and contention slot durations per superframe. Finally, power management is a significant feature of the 802.15.3 MAC protocol, which is designed to significantly lower the current drain during sleep, wake-up, polling, and network scan periods.

Figure 5:
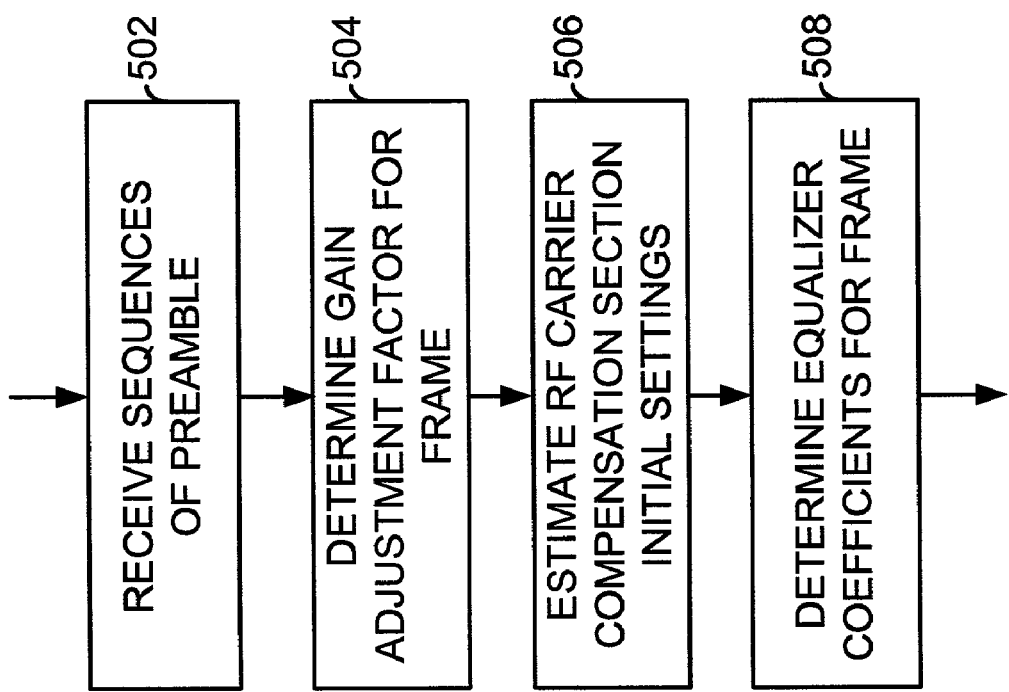
FIG. 5 is a logic diagram illustrating a first embodiment of operations performed during signal acquisition operations to the present invention.

FIG. 5 is a logic diagram illustrating a first embodiment of operations performed during signal acquisition operations to the present invention. In a first operation, the preamble processor 210 receives preamble sequences (502) of a subject frame and begins processing the preamble sequences. In a first processing operation, the preamble processor 210 determines a gain adjustment factor for the frame to be applied by the PGA 207 (step 504). During this processing step, the overall gain is computed and adjusted during the reception of the periodic preamble by monitoring the maximum amplitude and the average signal energy in the receiver delay line (the stored preamble sequence). The algorithm guarantees that the average signal energy in the receiver delay line stabilizes to its target value at the completion of preamble processing. These operations take between 4 and 5 CAZAC periods to converge.

Then, the preamble processor 210 estimates initial settings for the RF carrier compensation section 214 that the RF carrier compensation section 214 will used for the data carrying portions of the frame (step 506). These initial settings are determined by monitoring a "periodicity metric" at the receiver. A linear time-invariant channel preserves the periodicity of a cyclic CAZAC sequence, therefore the received preamble would still be periodic except for a phase rotation due to carrier-offset between received samples that are one-period apart. Received preamble samples (T/2 spaced) stored in the receiver delay line are processed according to the following equation:

$$x_{nq-i} = u_{nq-i} \cdot e^{j2\pi \Delta f_c (nq-i) T/q} + w_{nq-i} \quad i = 0, 1, \ldots, Mq-1$$

where:
M: length of CAZAC sequence in T;
q: equals 2 for a T/2 sampled receiver;
w: AWGN samples; and
u: represents the convolution of CAZAC sequence with the channel.

The presence of a cyclic training sequence can be recognized by computing and monitoring a periodicity metric:

$$m_n = \min_\varphi \left\{ \frac{1}{W} \sum_{i=1}^{W-1} |x_{nq-iq} - x_{nq-Mq-iq} e^{j\varphi}|^2 \right\}$$

where:
W: represents the measurement window Φ: phase offset due to carrier-offset between samples one period apart.

Phase offset that minimizes above metric and estimate of carrier-offset are given by $$\varphi_{\min} = \arg\left( \sum_{i=0}^{W-1} x_{nq-iq} \cdot x^*_{nq-Mq-iq} \right)$$

$$\varphi_{\min} = 2\pi \Delta f_c MT \to \Delta f_c = \frac{\varphi_{\min}}{2\pi \cdot MT}$$

where:

$$|\Delta f_c| < \frac{1}{2MT}$$

This carrier-offset is then provided to the RF carrier compensation section 214. The RF carrier compensation section 214 then uses this value in determining its initial carrier adjustment operator, Ψ(0).

Next, the preamble processor 210 determines DFE coefficients (taps) that will be used by the DFE 216 (FFE 266 and FBE 270) for the data carrying portions of the frame (step 508). The determination of DFE coefficients is a two part process. In the first step, the channel is estimated based upon the preamble sequence. In the second step, the DFE coefficients are determined based upon the channel estimate and provided to the DFE 216 (FFE 266 and FBE 270).

In estimating the channel, the received signal xn is represented in vector/matrix format as $$x = Bh + w$$

where:
x is a vector containing 2M T/2-spaced received samples
h is a vector representing T/2 spaced channel response
B is a matrix with rows consisting of cyclically rotated replicas (T/2 spaced) of the CAZAC sequence; and
w represents the AWGN vector.

The channel response ĥ thus minimizes $\|B\hat{h} - x\|^2$ and is given by:

$$\hat{h} = (B^H B)^{-1} B^H x$$

but, $(B^H B)^{-1} = 1/M$ thus, consequently the channel estimate is provided by:

$$\hat{h} = B^H / M x$$

After obtaining the channel estimate ĥ, the MMSE-DFE coefficients are calculated by minimizing the MSE between the input and estimated data symbols in an iterative fashion using a fast Cholesky factorization algorithm (See, Al-Dhair et. al., "Fast Computation of Channel-Estimate Based Equalizers in Packet Data Transmission", 1995, IEEE Trans. on Signal Processing).

While the operations of steps 504, 506, and 508 of FIG. 5 may be performed after receipt of all of the sequences of the preamble. Alternately, the operations of steps 504, 506, and 508 may be performed during the receipt of the sequences of the preamble. Further, some of the operations of steps 504, 506, and 508 may be performed after receipt of all of the sequences of the preamble while other of the operations steps 504, 506, and 508 may be performed during the receipt of the sequences of the preamble.

Figure 6:
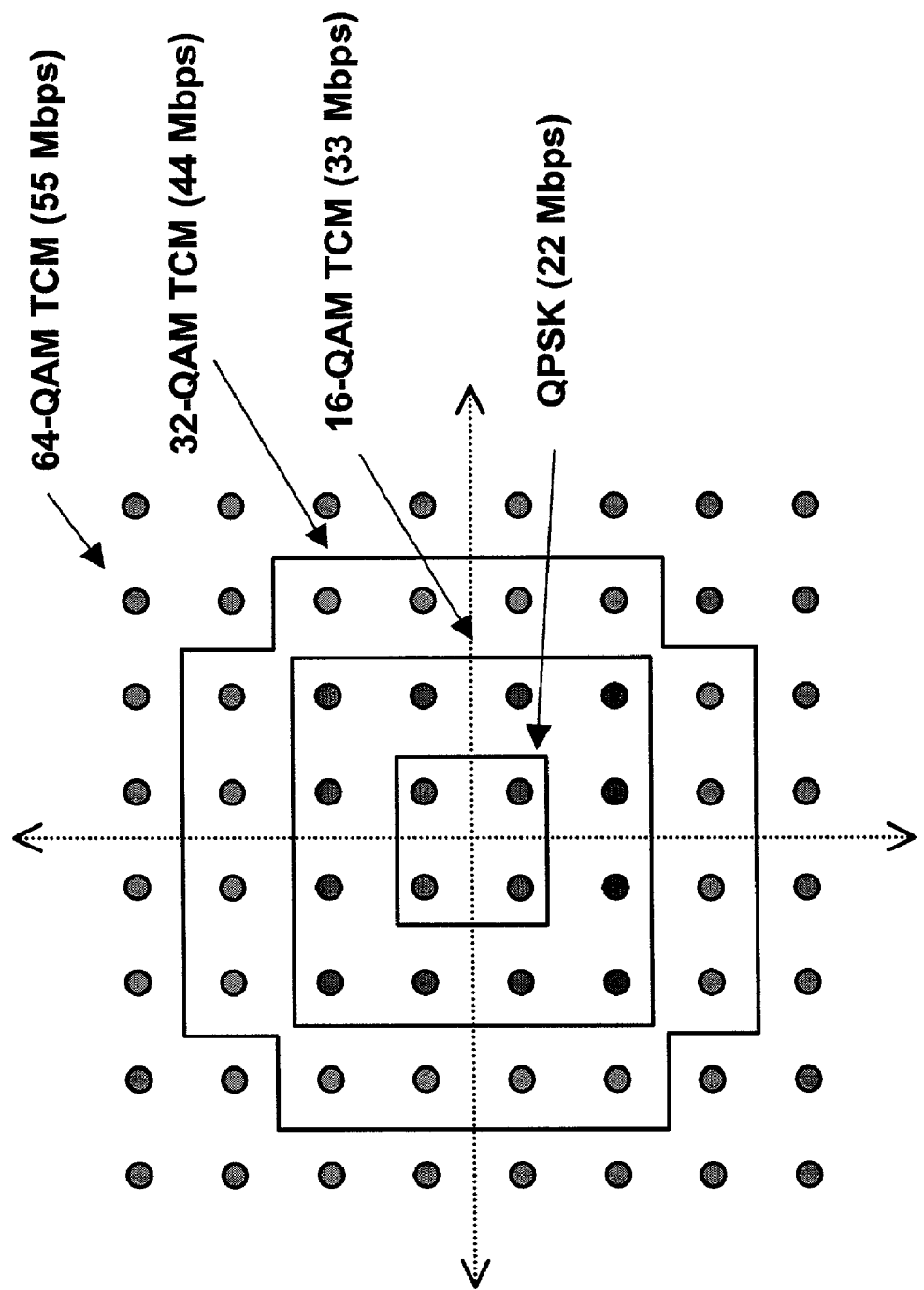
FIG. 6 is a diagram illustrating a quadrature amplitude modulation constellation operated upon by the receiver of FIGS. 2A and 2B according to the present invention.

FIG. 6 is a diagram illustrating a quadrature amplitude modulation constellation operated upon by the receiver of FIGS. 2A and 2B according to the present invention. The RF transceiver 202 and baseband transceiver used in the implementation of the 802.15.3 system PHY layer are optimized for short range transmissions of less than 10 meters. This particular transmission characteristic enables low cost and small form factor (compact flash) MAC and PHY implementations for integration in consumer devices. The PHY layer also consumes low current drain (less than 80 mA) while actively transmitting or receiving data and much lower current drain during sleep and polling durations.

802.15.3 system PHY layer is designed to achieve data rates from 11 Mbps to 55 Mbps, which are commensurate with the distribution of high definition video and high quality audio. The general characteristics of the PHY layer are tabulated in Table 2. The 802.15.3 PHY layer operates at an 11 Msymbols/sec symbol rate, the same symbol rate that is used in 802.11b systems. Operating on this symbol rate, four distinct modulation formats are specified, namely, Binary Phase Shift Keying (11 Mbps), Quadrature Phase Shift Keying (QPSK) modulation (22 Mbps) and 16/32/64-QAM (33, 44, 55 Mbps, respectively) with Trellis Coded Modulation (TCM).

TABLE 2

MODULATION TYPES AND DATA RATES

| Modulation | Data Rate |
| --- | --- |
| BPSK | 11 Mbps |
| QPSK | 22 Mbps |
| 16-QAM-TCM | 33 Mbps |
| 32-QAM-TCM | 44 Mbps |
| 64-QAM-TCM | 55 Mbps |

The base modulation is QPSK and is used during the formation of the ad-hoc WPAN networks and during rate negotiations. The BPSK modulation is designed for the lowest cost implementations with the lowest of the data rates supported by the standard. As such, no additional coding is used for BPSK implementations. Further, BPSK modulation may be used for extended operating range. Depending on the capabilities of the devices on both ends, the higher data rates from 22 Mbps to 55 Mbps are achieved by using QPSK and 16, 32, 64-QAM schemes with 8-state 2-D Trellis coding. The transmit power level is limited between 0 and 8.8 dBm to comply with the FCC 15.249 rules.

Figure 7:
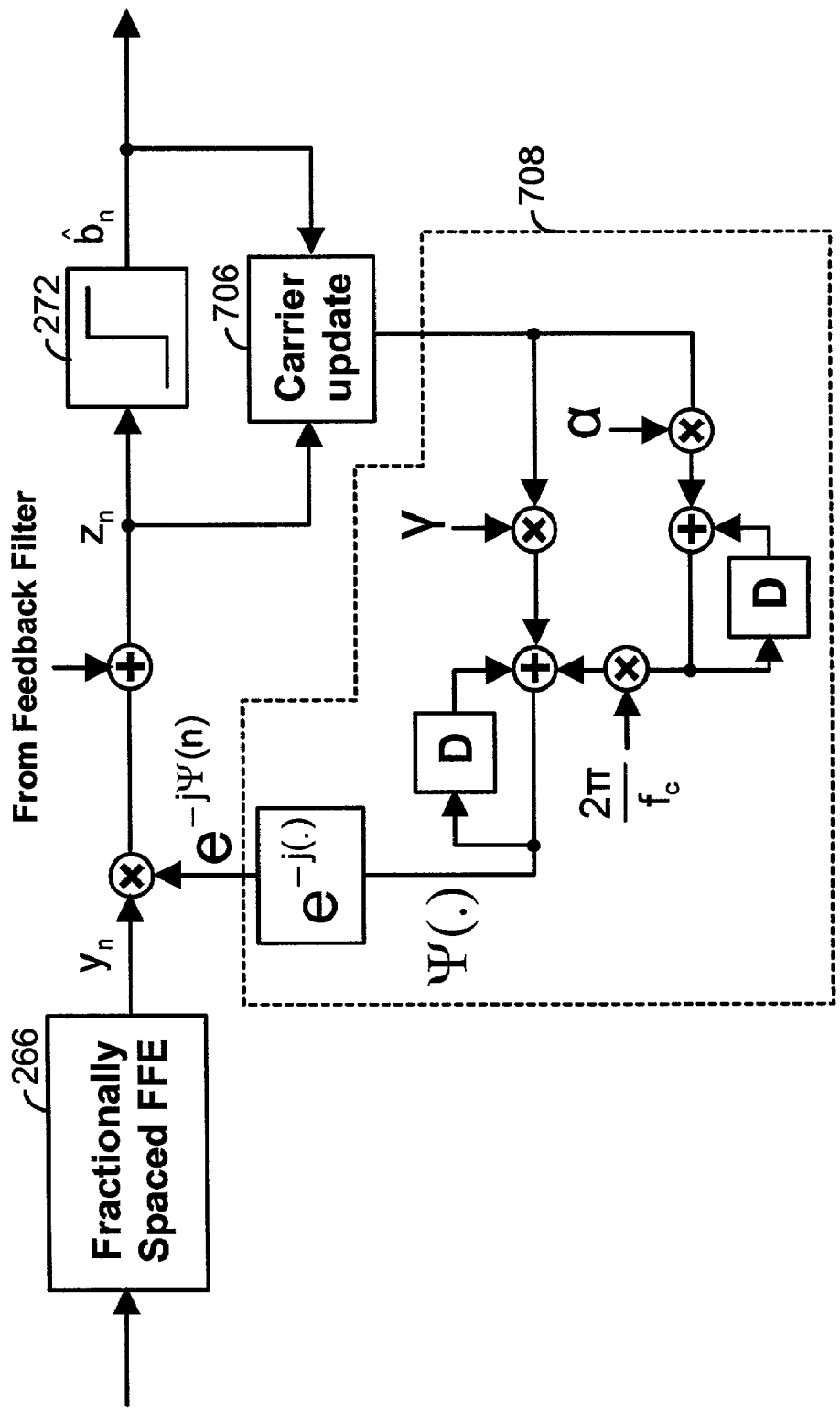
FIG. 7 is a block diagram illustrating one embodiment of RF carrier compensation operations performed according to the present invention.

FIG. 7 is a block diagram illustrating one embodiment of RF carrier compensation operations performed according to the present invention. A Fractionally Spaced FFE 702 receives the output from the resampler 264 of FIG. 2B. The elements of FIG. 7 that correspond to the elements of FIG. 2B retain common numbering. The carrier tracking block 274 of FIG. 2B corresponds to elements 706 and 708 of FIG. 7.

Carrier update block 706 couples to the input $z_n$ and the output $b_n$ of the tentative decision block 272. The carrier update block 706 produces the following output, which represents the error in the tentative decision:

$$\frac{\text{Im}\{z_n b_n^*\}}{|b_n|^2}$$

The operations enclosed within dotted line 708 are then performed to produce a carrier adjustment operator $e^{-j\Psi(n)}$ that is applied to the output of the fractionally spaced FFE 266. The operator $e^{-j\Psi(n)}$ is calculated based upon the following operation:

$$\Psi(n+1) = \Psi(n) - y \cdot \frac{\text{Im}\{z_n b_n^*\}}{|b_n|^2} + \frac{2\pi}{f_c} \cdot \hat{\Delta} f(n)$$

where:

$$\hat{\Delta} f(n) = \hat{\Delta} f(n-1) - \alpha \cdot \frac{\text{Im}\{z_n b_n^*\}}{|b_n|^2}$$

Finally, as was previously described, the initial settings for the RF carrier compensation section are based upon computations made by the preamble processor 210.

Figure 8:
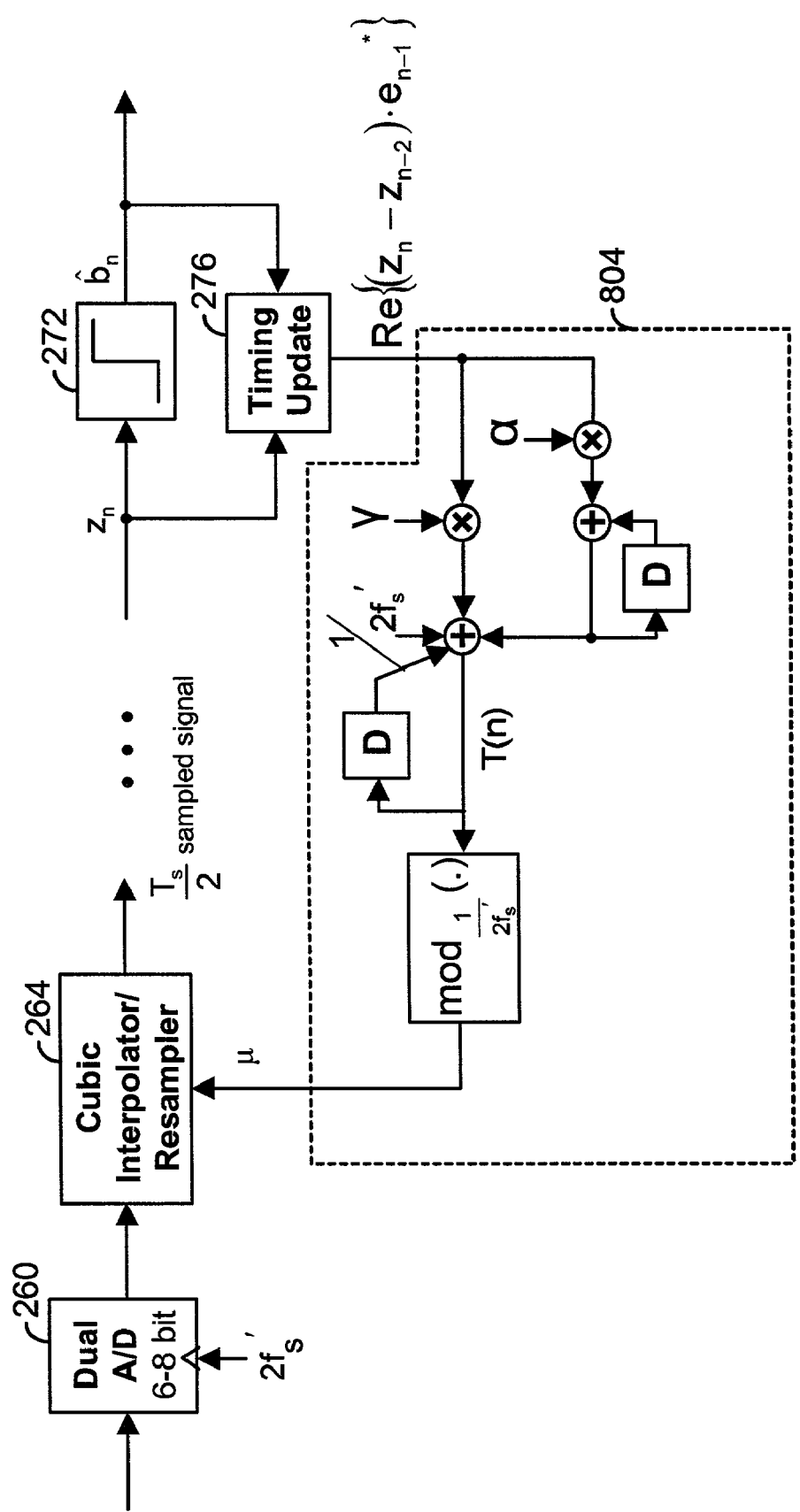
FIG. 8 is a block diagram illustrating one embodiment of symbol timing compensation operations performed according to the present invention.

FIG. 8 is a block diagram illustrating one embodiment of symbol timing compensation operations performed according to the present invention. The ADC 260 produces output, which is provided to the cubic interpolator/resampler 264 that produces a fractionally spaced output. Input to the cubic interpolator/resampler 264 is provided by the operations within dotted line 804. These operations receive as input the output of a timing update block 276 that is coupled to the tentative decision block 272. The timing update block 276 produces as its output:

$$Re\{(z_n - z_{n-2}) \cdot e_{n-1}^*\}$$

Subsequently, the operations within the dotted line 804 operate to produce the input $\mu$ to the cubic interpolator/resampler 264 according to the following:

$$T(n+1) = T(n) + \frac{1}{2f_s'} - y \cdot \text{Re}\{(z_n - z_{n-2}) \cdot e_{n-1}^*\} + \Delta T(n)$$

where:

$\Delta T(n) = \Delta T(n-1) - \alpha \cdot Re\{(z_n - z_{n-2}) \cdot e_{n-1}^*\}$ In such case, $\mu$ is equal to $$\text{mod}_{\frac{1}{2f_s'}}(T(n)).$$

Figure 9:
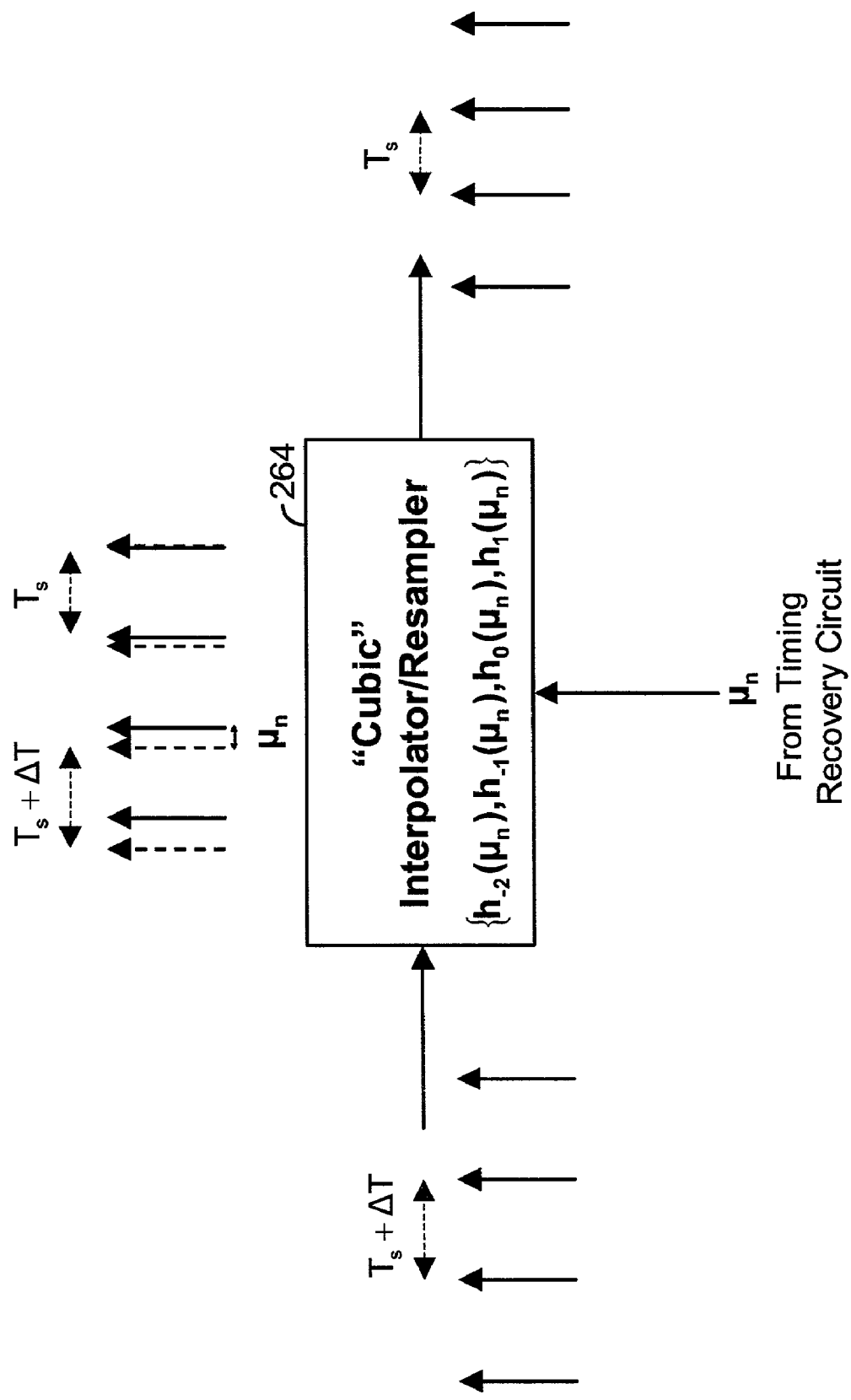
FIG. 9 is a block diagram illustrating the operation of a cubic interpolator/resampler employed with the symbol timing compensation operations of FIG. 8 according to the present invention.

FIG. 9 is a block diagram illustrating the operation of a cubic interpolator/resampler 264 employed with the symbol timing compensation operations of FIG. 8 according to the present invention. The cubic interpolator/resampler 264 operates according to the following equations:

$$h_{-2}(\mu_n) = \frac{(\mu_n+1) \cdot \mu_n \cdot (\mu_n-1)}{6}$$

$$h_{-1}(\mu_n) = \frac{(\mu_n+1) \cdot \mu_n \cdot (\mu_n-2)}{-2}$$

$$h_0(\mu_n) = \frac{(\mu_n+1) \cdot (\mu_n-1) \cdot (\mu_n-2)}{2}$$

$$h_1(\mu_n) = \frac{\mu_n \cdot (\mu_n-1) \cdot (\mu_n-2)}{-6}$$

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A baseband receiver section of a wireless device that couples to a Radio Frequency (RF) transceiver of the wireless device and that extracts data from a baseband signal received from the RF transceiver of the wireless device, the baseband receiver section comprising:

a programmable gain amplifier that receives the baseband signal and adjusts the gain of the baseband signal;

an Analog-to-Digital Converter (ADC) that receives the baseband signal from the programmable gain amplifier and that samples the baseband signal to produce samples of the baseband signal;

a symbol timing compensation section that modifies the samples of the baseband signal to compensate for symbol timing variations between a symbol clock of the wireless device and a symbol clock of a transmitting wireless device;

an RF carrier compensation section that modifies the samples of the baseband signal to compensate for RF carrier variations between an RF carrier of the wireless device and an RF carrier of the transmitting wireless device, wherein the RF carrier compensation section comprises:

a tentative decision block that determines an error in a tentative decision according to:

$$\frac{\operatorname{Im}\{z_n b_n^*\}}{|b_n|^2}$$

where:

$z_n$ is the input to the tentative decision block; and
$b_n$ is the output of the tentative decision block; and a carrier tracking block that uses the error in the tentative decision to determine an adjustment operator $e^{-j\Psi(n)}$ is used to modify the samples of the baseband signal;

a decision feedback equalizer that filters the modified samples of the baseband signal and extracts the data from the modified samples of the baseband signal; and a preamble processor that receives samples of the baseband signal corresponding to a preamble of a frame that carries the data and, based upon the samples of the preamble:

estimates a gain to be applied by the programmable gain amplifier;

estimates initial settings for the RF carrier compensation section; and estimates equalizer coefficients for the decision feedback equalizer.

2. The baseband receiver section of claim 1, wherein the preamble comprises a plurality of periods of a Constant Amplitude Zero Auto-Correlation (CAZAC) sequence.

3. The baseband receiver section of claim 1, wherein:

the preamble processor characterizes a channel between the wireless device and the transmitting wireless device based upon the preamble; and the preamble processor determines the equalizer coefficients based upon an estimate of the wireless channel.

4. The baseband receiver section of claim 1, wherein the baseband signal is coded in one of Binary Phase Shift Keying, Quadrature Phase Shift Keying, 16 Quadrature Amplitude Modulation, 32 Quadrature Amplitude Modulation, and 64 Quadrature Amplitude Modulation.

5. The baseband receiver section of claim 4, wherein the baseband signal is also coded using Trellis Code Modulation.

6. The baseband receiver section of claim 1, wherein the adjustment operator $$e^{-j\Psi(n)}$$

is determined according to:

$$\Psi(n+1) = \Psi(n) - \gamma \cdot \frac{\operatorname{Im}\{z_n b_n^*\}}{|b_n|^2} + \frac{2\pi}{f_c} \cdot \hat{\Delta}f(n)$$

where:

$$\hat{\Delta}f(n) = \hat{\Delta}f(n-1) - \alpha \cdot \frac{\operatorname{Im}\{z_n b_n^*\}}{|b_n|^2};$$

$\gamma$ is a constant;
$\alpha$ is a constant; and
$f_c$ is the RF carrier frequency.

7. The baseband receiver section of claim 1, wherein the symbol timing compensation section comprises:

a tentative decision block that determines an error in a tentative decision;

a timing update section that generates a timing update based upon the error in the tentative decision; and a cubic interpolator/resampler coupled to the output of the ADC that resamples the baseband signal based upon the timing update.

8. A baseband receiver section of a wireless device that couples to a Radio Frequency (RF) transceiver of the wireless device and that extracts data from a baseband signal received from the RF transceiver of the wireless device, the baseband receiver section comprising:

a programmable gain amplifier that receives the baseband signal and adjusts the gain of the baseband signal;

an Analog-to-Digital Converter (ADC) that receives the baseband signal from the programmable gain amplifier and that samples the baseband signal to produce samples of the baseband signal;

a symbol timing compensation section that modifies the samples of the baseband signal to compensate for symbol timing variations between a symbol clock of the wireless device and a symbol clock of a transmitting wireless device, the symbol timing compensation section comprising:
- a tentative decision block that determines an error in a tentative decision;
- a timing update section that generates a timing update based upon the error in the tentative decision, wherein the timing update is determined according to:

$Re\{(z_n-z_{n-2}) \cdot e_{n-1}^*\}$ where:
$z_n$ is the input to the tentative decision block; and
$e_n$ is the error in the tentative decision; and
- a cubic interpolator/resampler coupled to the output of the ADC that resamples the baseband signal based upon the timing update;

an RF carrier compensation section that modifies the samples of the baseband signal to compensate for RF carrier variations between an RF carrier of the wireless device and an RE carrier of the transmitting wireless device;

a decision feedback equalizer that filters the modified samples of the baseband signal and extracts the data from the modified samples of the baseband signal; and a preamble processor that receives samples of the baseband signal corresponding to a preamble of a frame that carries the data and, based upon the samples of the preamble:
- estimates a gain to be applied by the programmable gain amplifier;
- estimates initial settings for the RE carrier compensation section; and
- estimates equalizer coefficients for the decision feedback equalizer.

9. The baseband receiver section of claim 8, wherein the samples of the baseband signal output by the ADC are resampled by the cubic interpolator/resampler according to:

$\mod_{\frac{1}{2f_s'}} (T(n))$ where:

$T(n+1) = T(n) + \frac{1}{2f_s'} - \gamma \cdot Re\{(z_n - z_{n-2}) \cdot e_{n-1}^*\} + \Delta T(n);$ $\Delta T(n) = \Delta T(n-1) - \alpha \cdot Re\{(z_n - z_{n-2}) \cdot e_{n-1}^*\};$ $\gamma$ is a constant;
$\alpha$ is a constant; and
$f_s$ is the symbol clock frequency.

10. The baseband receiver section of claim 9, wherein the cubic interpolator/resampler resamples the baseband signal further according to:

$h_{-2}(\mu_n) = \frac{(\mu_n+1) \cdot \mu_n \cdot (\mu_n-1)}{6};$ $h_{-1}(\mu_n) = \frac{(\mu_n+1) \cdot \mu_n \cdot (\mu_n-2)}{-2};$ -continued $h_0(\mu_n) = \frac{(\mu_n+1) \cdot (\mu_n-1) \cdot (\mu_n-2)}{2};$ and $h_1(\mu_n) = \frac{\mu_n \cdot (\mu_n-1) \cdot (\mu_n-2)}{-6}.$ 11. A method for extracting data from a received baseband signal, the method comprising:
- based upon a preamble of a frame that carries the data:
  - estimating a gain factor;
  - estimating initial RF carrier compensation section settings; and
  - estimating equalizer coefficients;
- adjusting the gain of the baseband signal by the gain factor;
- sampling the baseband signal to produce samples of the baseband signal;
- modifying the samples of the baseband signal to compensate for symbol timing variations between a symbol clock of a receiving wireless device and a symbol clock of a transmitting wireless device;
- modifying the samples of the baseband signal to compensate for RF carrier variations between an RF carrier of the receiving wireless device and an RF carrier of the transmitting wireless device, wherein the samples of the baseband signal are modified to compensate for RF carrier variations by:
  - determining an error in a tentative decision according to:

$\frac{Im\{z_n b_n^*\}}{|b_n|^2}$ where:
$z_n$ is the input to the tentative decision block; and
$b_n$ is the output of the tentative decision block; and
modifying the samples of the baseband signal by an adjustment operator $e^{-j\Psi(n)}$;
filtering the modified samples of the baseband signal using the equalizer coefficients; and
extracting the data from the modified samples of the baseband signal.

12. The method of claim 11, wherein the preamble comprises a plurality of periods of a Constant Amplitude Zero Auto-Correlation (CAZAC) sequence.

13. The method of claim 12, wherein:
the preamble processor estimates a channel between the wireless device and the transmitting wireless device based upon the preamble; and
the preamble processor estimates the equalizer coefficients based upon an estimate of the wireless channel.

14. The method of claim 11, wherein the baseband signal is coded in one of Binary Phase Shift Keying, Quadrature Phase Shift Keying, 16 Quadrature Amplitude Modulation, 32 Quadrature Amplitude Modulation, and 64 Quadrature Amplitude Modulation.

15. The method of claim 14, wherein the baseband signal is also coded using Trellis Code Modulation.

16. The method of claim 11, wherein the adjustment operator $e^{-j\Psi(n)}$ is determined according to:

$$\Psi(n+1) = \Psi(n) - \Upsilon \cdot \frac{\text{Im}\{z_n b_n^*\}}{|b_n|^2} + \frac{2\pi}{f_c} \cdot \hat{\Delta} f(n)$$

where:

$$\hat{\Delta} f(n) = \hat{\Delta} f(n-1) - \alpha \cdot \frac{\text{Im}\{z_n b_n^*\}}{|b_n|^2};$$

$\gamma$ is a constant;
$\alpha$ is a constant; and
$f_c$ is the RF carrier frequency.

17. The method of claim 11, wherein the samples of the baseband signal are modified to compensate for symbol timing variations by:
  determining an error in a tentative decision;
  generating a timing update based upon the error in the tentative decision; and
  resampling the baseband signal based the timing update.

18. A method for extracting data from a received baseband signal, the method comprising:
  based upon a preamble of a frame that carries the data:
    estimating a gain factor;
    estimating initial RF carrier compensation section settings; and
    estimating equalizer coefficients;
  adjusting the gain of the baseband signal by the gain factor;
  sampling the baseband signal to produce samples of the baseband signal;
  modifying the samples of the baseband signal to compensate for symbol timing variations between a symbol clock of a receiving wireless device and a symbol clock of a transmitting wireless device, wherein the samples of the baseband signal are modified to compensate for symbol timing variations by:
    determining an error in a tentative decision;
    generating a timing update based upon the error in the tentative decision,
  wherein the timing update is determined according to:

$Re\{(z_n - z_{n-2}) \cdot e_{n-1}^*\}$ where:
    $z_n$ is the input to the tentative decision block; and
    $e_n$ is the error in the tentative decision; and
  resampling the baseband signal based upon the timing update;
  modifying the samples of the baseband signal to compensate for RF carrier variations between an RF carrier of the receiving wireless device and an RF carrier of the transmitting wireless device;
  filtering the modified samples of the baseband signal using the equalizer coefficients; and
  extracting the data from the modified samples of the baseband signal.

19. The method of claim 18, wherein the samples of the baseband signal are resampled according to:

$$\text{mod}_{\frac{1}{2f_s'}}(T(n))$$

where:

$$T(n+1) = T(n) + \frac{1}{2f_s'} - \Upsilon \cdot \text{Re}\{(z_n - z_{n-2}) \cdot e_{n-1}^*\} + \Delta T(n);$$

$$\Delta T(n) = \Delta T(n-1) - \alpha \cdot \text{Re}\{(z_n - z_{n-2}) \cdot e_{n-1}^*\};$$

$\gamma$ is a constant;
$\alpha$ is a constant; and
$f_s$ is the symbol clock frequency.

20. The method of claim 19, wherein the samples of the baseband signal are resampled by cubically interpolating the baseband signal according to:

$$h_{-2}(\mu_n) = \frac{(\mu_n + 1) \cdot \mu_n \cdot (\mu_n - 1)}{6};$$

$$h_{-1}(\mu_n) = \frac{(\mu_n + 1) \cdot \mu_n \cdot (\mu_n - 2)}{-2};$$

$$h_0(\mu_n) = \frac{(\mu_n + 1) \cdot (\mu_n - 1) \cdot (\mu_n - 2)}{2}; \text{ and}$$

$$h_1(\mu_n) = \frac{\mu_n \cdot (\mu_n - 1) \cdot (\mu_n - 2)}{-6}.$$

* * * * *

UNITED STATES PATENT AND TRADEMARK OFFICE
CERTIFICATE OF CORRECTION

PATENT NO. : 7,079,599 B2 Page 1 of 1
APPLICATION NO. : 09/949989
DATED : July 18, 2006
INVENTOR(S) : Jeyhan Karaoguz It is certified that error appears in the above-identified patent and that said Letters Patent is hereby corrected as shown below:

Column 17, line 21, in Claim 8: replace "RE" with --RF--.

Column 17, line 33, in Claim 8: replace "RE" with --RF--.

Signed and Sealed this

Second Day of December, 2008

JON W. DUDAS
*Director of the United States Patent and Trademark Office*